(12) United States Patent
Miyazaki et al.

(10) Patent No.: US 10,230,114 B2
(45) Date of Patent: Mar. 12, 2019

(54) OXYGEN REDUCTION CATALYST, USES THEREOF AND PRODUCTION PROCESS THEREFOR

(71) Applicant: SHOWA DENKO K.K., Tokyo (JP)

(72) Inventors: Kousuke Miyazaki, Tokyo (JP); Takuya Imai, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 475 days.

(21) Appl. No.: 14/901,199

(22) PCT Filed: May 28, 2014

(86) PCT No.: PCT/JP2014/064146
§ 371 (c)(1),
(2) Date: Dec. 28, 2015

(87) PCT Pub. No.: WO2015/005011
PCT Pub. Date: Jan. 15, 2015

(65) Prior Publication Data
US 2016/0156042 A1    Jun. 2, 2016

(30) Foreign Application Priority Data
Jul. 12, 2013   (JP) ................. 2013-146721

(51) Int. Cl.
*H01M 4/90*     (2006.01)
*H01M 4/92*     (2006.01)
*H01M 8/1004*   (2016.01)

(52) U.S. Cl.
CPC ....... *H01M 4/9083* (2013.01); *H01M 4/9041* (2013.01); *H01M 4/925* (2013.01);
(Continued)

(58) Field of Classification Search
CPC .. H01M 4/9083; H01M 4/925; H01M 4/9041; H01M 4/926; H01M 8/1004; H01M 2300/0082
See application file for complete search history.

(56) References Cited

U.S. PATENT DOCUMENTS

2009/0029216 A1    1/2009  Yamamoto
2010/0331172 A1   12/2010  Monden et al.
(Continued)

FOREIGN PATENT DOCUMENTS

CN    101909749 A    12/2010
CN    101959599 A     1/2011
(Continued)

OTHER PUBLICATIONS

Bezerra et al., "A review of heat-treatment effects on activity and stability of PEM fuel cell catalysts for oxygen reduction reaction," 2007, Journal of Power Sources, 173, 891-908. (Year: 2007).*
(Continued)

*Primary Examiner* — Ula C Ruddock
*Assistant Examiner* — Matthew W Van Oudenaren
(74) *Attorney, Agent, or Firm* — Sughrue Mion, PLLC

(57) ABSTRACT

An oxygen reduction catalyst includes a composite particle, the composite particle including a carbon structure and particles each including a Group 4 metal element M1, the composite particle containing a Group 4 metal element M1, carbon, nitrogen and oxygen, the particles each including a Group 4 metal element M1 being dispersed in the carbon structure, and the composite particle having a percentage of mass loss (a) and a percentage of mass loss (b), which are represented by specific formulae, of not more than 15% and 25 to 70%, respectively.

15 Claims, 4 Drawing Sheets

(52) U.S. Cl.
CPC ......... *H01M 4/926* (2013.01); *H01M 8/1004* (2013.01); *H01M 2300/0082* (2013.01); *Y02P 70/56* (2015.11)

(56) References Cited

U.S. PATENT DOCUMENTS

| | | | |
|---|---|---|---|
| 2011/0008709 | A1 | 1/2011 | Shishikura et al. |
| 2011/0053040 | A1 | 3/2011 | Monden et al. |
| 2011/0053049 | A1 | 3/2011 | Imai et al. |
| 2012/0094207 | A1* | 4/2012 | Wakizaka ............ H01M 4/9016 429/482 |
| 2012/0231338 | A1 | 9/2012 | Matsuzaka et al. |
| 2012/0315568 | A1* | 12/2012 | Lee .................... C01B 21/0828 429/483 |
| 2013/0280639 | A1 | 10/2013 | Imai et al. |
| 2013/0302715 | A1 | 11/2013 | Horikita et al. |
| 2013/0337367 | A1 | 12/2013 | Monden et al. |
| 2014/0011102 | A1 | 1/2014 | Ota et al. |
| 2014/0186743 | A1 | 7/2014 | Wakizaka et al. |
| 2014/0193739 | A1 | 7/2014 | Takahashi et al. |

FOREIGN PATENT DOCUMENTS

| | | |
|---|---|---|
| CN | 101978538 A | 2/2011 |
| CN | 102754260 A | 10/2012 |
| EP | 2535971 A1 | 12/2012 |
| JP | 2005-246181 A | 9/2005 |
| JP | 2007-112660 A | 5/2007 |
| JP | 2009-226311 A | 10/2009 |
| JP | 2011-115760 A | 6/2011 |
| JP | 2012/200643 A | 10/2012 |
| JP | 2013-51214 A | 3/2013 |
| JP | 2013-062251 A | 4/2013 |
| JP | 2013-127869 A | 6/2013 |
| WO | 2006/088194 A1 | 8/2006 |
| WO | 2009/104500 A1 | 8/2009 |
| WO | 2010/126020 A1 | 11/2010 |
| WO | 2011/099493 A1 | 8/2011 |
| WO | WO2011099493 * | 8/2011 |
| WO | 2012/035501 A1 | 3/2012 |
| WO | 2012-098712 A1 | 7/2012 |
| WO | 2013/008501 A1 | 1/2013 |
| WO | 2013/035191 A1 | 3/2013 |

OTHER PUBLICATIONS

Communication dated Jan. 24, 2017, from the European Patent Office in counterpart European Application No. 14823374.5.
Liu, The Study of Tungsten-based Supporters for PEMFC Catalyst, Harbin Institute of Technology, Jun. 2011, 11 pages total.
Yang, et al., Introduction to Material Science and Engineering, Science Press, 2012, 7 pages total.

* cited by examiner

[Fig. 1]
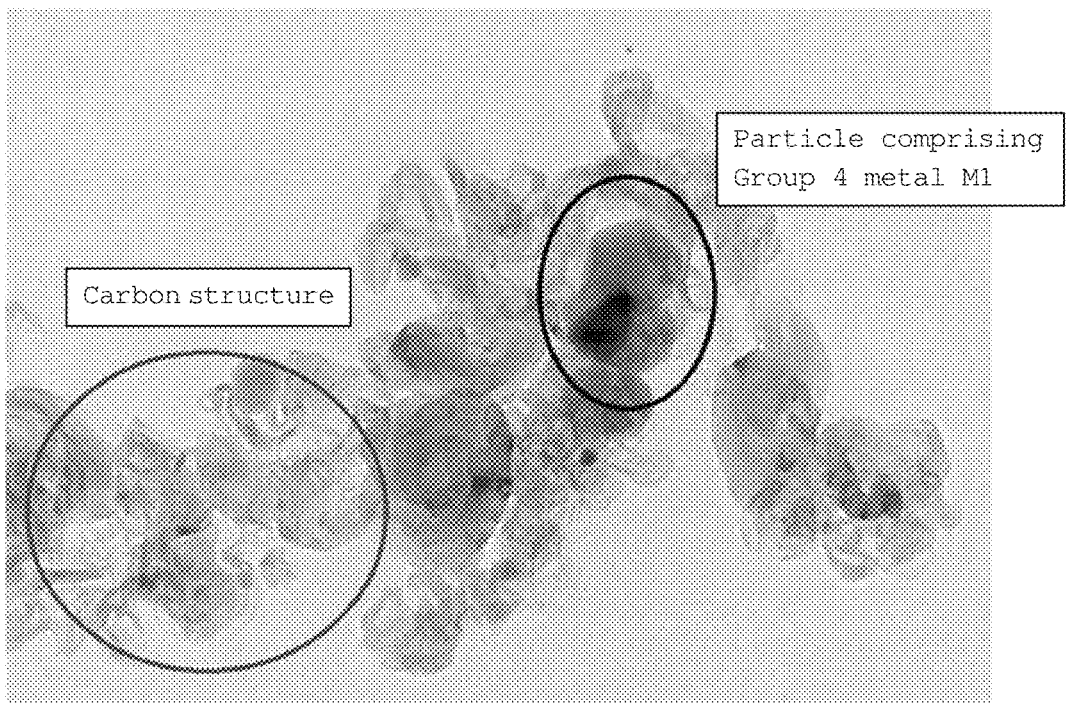
[Fig. 2]
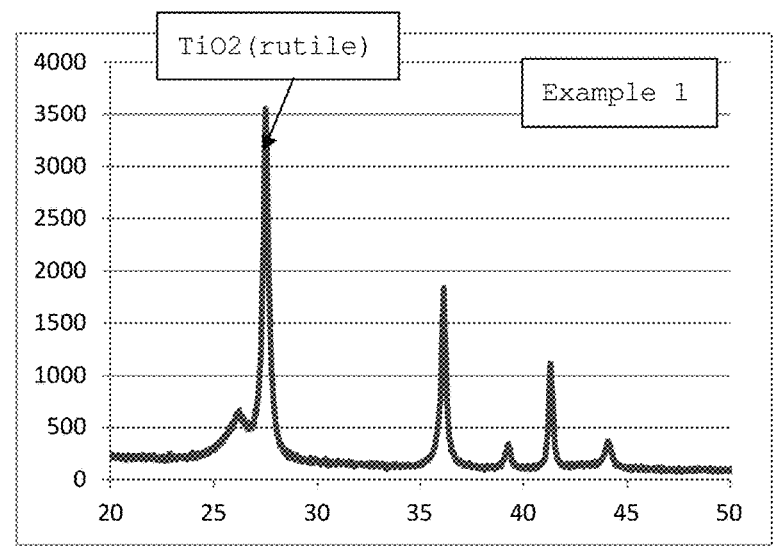

[Fig. 3]
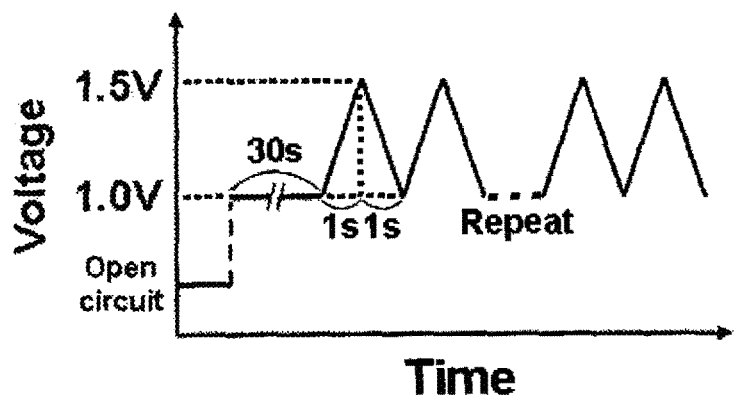
[Fig. 4]
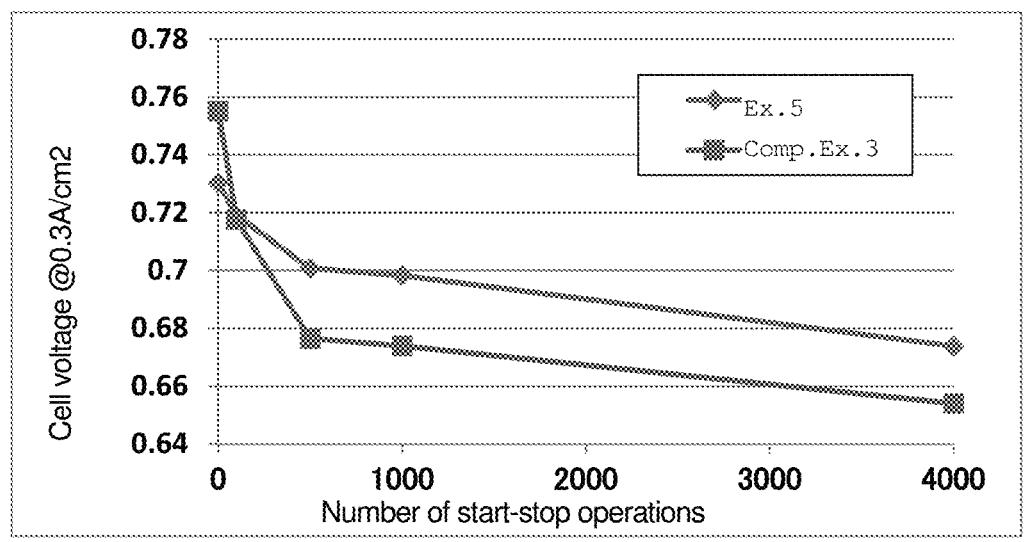

[Fig. 5]
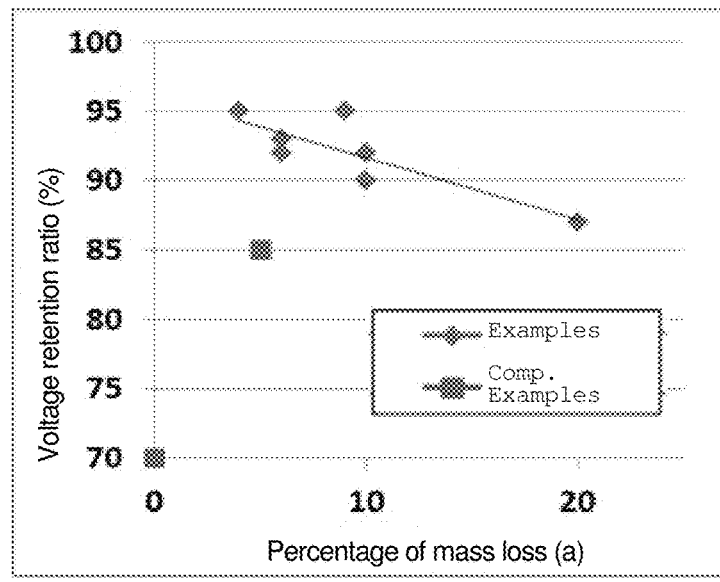
[Fig. 6]
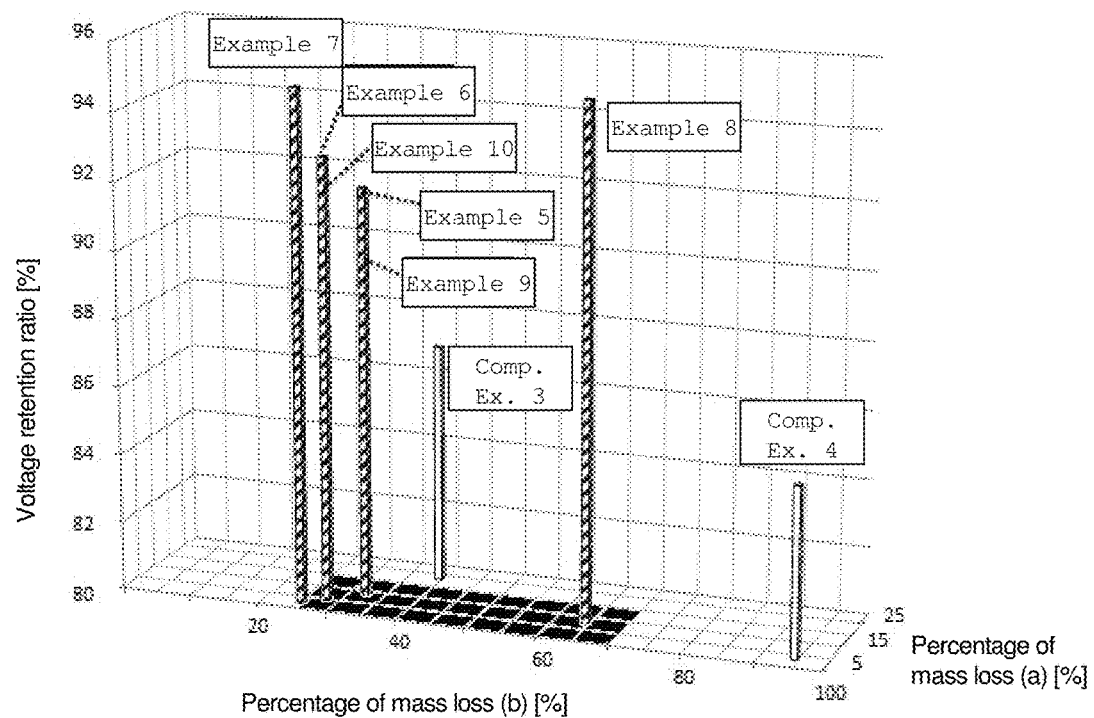

[Fig. 7]
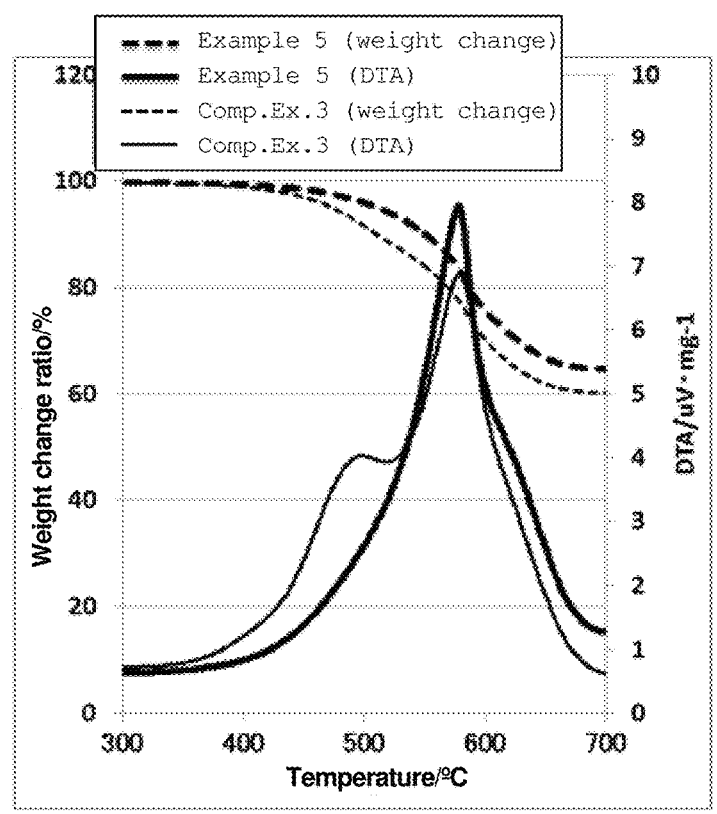

OXYGEN REDUCTION CATALYST, USES THEREOF AND PRODUCTION PROCESS THEREFOR

CROSS REFERENCE TO RELATED APPLICATIONS

This application is a National Stage of International Application No. PCT/JP2014/064146 filed May 28, 2014, claiming priority based on Japanese Patent Application No. 2013-146721 filed Jul. 12, 2013, the contents of all of which are incorporated herein by reference in their entirety.

TECHNICAL FIELD

The present invention relates to an oxygen reduction catalyst, uses thereof and a production process therefor, and more particularly relates to an oxygen reduction catalyst preferable as an electrode catalyst of a fuel cell, uses thereof and a production process therefor.

BACKGROUND ART

A polymer electrolyte fuel cell (PEFC) is a fuel cell in which a solid polymer electrolyte is interposed between an anode and a cathode, a fuel is supplied to the anode, oxygen or air is supplied to the cathode, whereby oxygen is reduced at the cathode to produce electricity. As the fuel, hydrogen, methanol or the like is mainly used. In order to increase a reaction rate of a fuel cell to thereby enhance energy conversion efficiency of the fuel cell, a layer containing a catalyst has been formed on a cathode surface or an anode surface of the fuel cell in the past. As this catalyst, a noble metal is generally used, and of noble metals, platinum that is stable at a high potential and has high activity is mainly used. As a carrier to support this catalyst metal, carbon black has been used in the past.

By the way, in this PEFC, the cathode is temporarily exposed to a high potential, e.g., about 1.5 V, during the repeating operations of starting and stopping. It is known that at such a high potential, carbon that is a carrier suffers oxidation corrosion to cause decomposition and deterioration of the carrier. Owing to deterioration of the carrier, power generation performance of the PEFC is lowered. Owing to deterioration of the carrier aggregation of the noble metal is accelerated, and therefore, the power generation performance is further lowered. Accordingly, a carrier or a catalyst having resistance to high potentials accompanying starting and stopping and a fuel cell electrode catalyst using it have been desired.

Patent literature 1 discloses a carrier for supporting a catalyst, which is obtained by carbonizing a raw material comprising a nitrogen-containing organic substance and a metal. Patent literature 2 discloses an electrode catalyst for a fuel cell, wherein the catalyst is produced by a production process comprising a step 1 of mixing a transition metal-containing compound, a nitrogen-containing organic compound and a solvent to obtain a catalyst precursor solution, a step 2 of removing the solvent from the catalyst precursor solution and a step 3 of heat-treating a solid residue at a temperature of 500 to 1100° C. to obtain an electrode catalyst, wherein a part or all of the transition metal-containing compound is a compound containing, as a transition metal element, a transition metal element M1 selected from elements of the periodic table Group 4 and Group 5. Patent literature 3 discloses a catalyst, which is a compound containing a metal element M selected from the group consisting of titanium, iron, niobium, zirconium and tantalum and shows peaks at 1340 $cm^{-1}$ to 1365 $cm^{-1}$ and 1580 $cm^{-1}$ to 1610 $cm^{-1}$ when measured by Raman spectroscopy. Patent literature 4 discloses a catalyst carrier comprising a metal oxycarbonitride containing niobium or the like as a metal. Patent literature 5 discloses an electrode catalyst produced by subjecting a carbon material having a noble metal supported thereon to heat treatment. Patent literature 6 discloses that acetylene black having a high specific surface area is obtained by subjecting acetylene black to oxidation treatment, and also discloses a catalyst for a fuel cell, wherein the catalyst comprises this acetylene black and, supported thereon, a platinum particle or the like.

However, any of the above carriers and catalysts does not have sufficient resistance to high potentials accompanying starting and stopping.

CITATION LIST

Patent Literature

Patent literature 1: JP-A 2011-115760
Patent literature 2: WO2011/099493
Patent literature 3: WO2010/126020
Patent literature 4: WO2009/104500
Patent literature 5: WO2006/088194
Patent literature 6: JP-A 2007-112660

SUMMARY OF INVENTION

Technical Problem

The present invention is intended to solve such a problem associated with the prior art, and it is an object of the present invention to provide an oxygen reduction catalyst having excellent start-stop durability in a fuel cell, and it is another object of the present invention to provide a production process for the catalyst.

Solution to Problem

The present invention relates to, for example, the following [1] to [16].

[1]
An oxygen reduction catalyst comprising a composite particle,
the composite particle comprising a carbon structure and particles each comprising a Group 4 metal element M1,
the composite particle containing a Group 4 metal element M1, carbon, nitrogen and oxygen,
the particles each comprising a Group 4 metal element M1 being dispersed in the carbon structure, and
the composite particle having a percentage of mass loss (a) and a percentage of mass loss (b), which are represented by the following formulas, of not more than 15% and 25 to 70%, respectively:

percentage of mass loss (a) (%)=(mass lost at 300 to 500° C.)/(mass at 300° C.)×100 percentage of mass loss (b) (%)=(mass lost at 300 to 800° C.)/(mass at 300° C.)×100 wherein each mass is a mass observed when the composite particle is subjected to simultaneous thermogravimetry-differential thermal analysis (TG-DTA) under the following conditions:
flow gas: air
gas flow rate: 0.2 L/min
temperature profile: the temperature is raised from 30° C. to 100° C. at a rate of 10° C./min, then maintained at 100° C. for 30 minutes, and then raised from 100° C. to 800° C. at a rate of 10° C./min.

[2]

The oxygen reduction catalyst as stated in [1], wherein the Group 4 metal element M1 is titanium.

[3]

The oxygen reduction catalyst as stated in [1] or [2], wherein the particles each comprising a Group 4 metal element M1 further contains an iron group metal element M2.

[4]

The oxygen reduction catalyst as stated in any one of [1] to [3], which is a supported catalyst comprising the composite particle and a noble metal particle supported on the composite particle.

[5]

The oxygen reduction catalyst as stated in [4], wherein the noble metal particle comprises a noble metal element selected from the group consisting of platinum, palladium, iridium, rhodium, silver and ruthenium, or an alloy of at least two kinds of the noble metal elements or an alloy of at least one kind of the noble metal elements and at least one metal element selected from the group consisting of iron, nickel, chromium, cobalt, titanium, copper, vanadium and manganese.

[6]

The oxygen reduction catalyst as stated in any one of [1] to [5], which is used in an oxygen reduction reaction of a fuel cell.

[7]

The oxygen reduction catalyst as stated in anyone [1] to [5], which is used in a reaction for converting oxygen into water.

[8]

A catalyst layer comprising the oxygen reduction catalyst as stated in any one of [1] to [7].

[9]

An electrode having the catalyst layer as stated in [8].

[10]

A membrane electrode assembly having a cathode, an anode and a polymer electrolyte membrane arranged between the cathode and the anode, wherein the cathode and/or the anode is the electrode as stated in [9].

[11]

A fuel cell having the membrane electrode assembly as stated in [10].

[12]

A process for producing the oxygen reduction catalyst as stated in [1], the process comprising a step of preparing a composite particle precursor containing a Group 4 metal element M1, carbon, nitrogen and oxygen and comprising a carbon structure and particles each of which comprises the Group 4 metal element M1 and which are dispersed in the carbon structure, and an oxidation step of bringing the composite particle precursor into contact with an oxidizing gas containing oxygen gas to oxidize and remove a part of carbon contained in the carbon structure.

[13]

The process for producing the oxygen reduction catalyst as stated in [12], wherein the oxidation step is carried out at a temperature of 200 to 600° C.

[14]

The process for producing the oxygen reduction catalyst as stated in [12] or [13], wherein the oxidation step is carried out over a period of 10 minutes to 24 hours.

[15]

The process producing for the oxygen reduction catalyst as stated in any one of [12] to [14], wherein the oxygen gas concentration in the oxidizing gas is 1 to 100% by volume.

[16]

The process for producing the oxygen reduction catalyst as stated in any one of [12] to [15], wherein the step of preparing a composite particle precursor comprises:

a step 1 of mixing a compound (1) containing a Group 4 metal element M1, a nitrogen-containing organic compound (2), with the proviso that at least one of the compound (1) and the compound (2) contains an oxygen atom, and a solvent, or mixing the compound (1), the compound (2), a compound (3) containing an iron group metal element M2, with the proviso that at least one of the compound (1), the compound (2) and the compound (3) contains an oxygen atom, and a solvent to obtain a raw material solution, a step 2 of removing the solvent from the raw material solution to obtain a solid residue, and a step 3 of heat-treating the solid residue obtained in the step 2 at a temperature of 700° C. to 1400° C. in a reducing atmosphere or an inert atmosphere to obtain a composite particle precursor.

Advantageous Effects of Invention

The fuel cell using the oxygen reduction catalyst of the present invention as an electrode catalyst is excellent in start-stop durability. According to the process for producing the oxygen reduction catalyst of the present invention, an oxygen reduction catalyst having excellent start-stop durability in a fuel cell can be produced.

BRIEF DESCRIPTION OF DRAWINGS

FIG. 1 is a transmission electron microscopic image of a catalyst (1) obtained in Example 1.

FIG. 2 is a powder X-ray diffraction pattern of a catalyst (1) obtained in Example 1.

FIG. 3 is a view exhibiting a triangle wave potential cycle applied in a start-stop durability test and showing a relationship between time and voltage.

FIG. 4 is a graph showing a relationship between the number of start-stop operations and a cell voltage in Example 5 and Comparative Example 3.

FIG. 5 is a graph showing a relationship between the percentage of mass loss (a) and a voltage retention ratio after 4,000 times of the start-stop operations.

FIG. 6 is a graph showing a relationship among the percentage of mass loss (a), the percentage of mass loss (b) and a voltage retention ratio after 4,000 times of the start-stop operations.

FIG. 7 is a graph showing measurement results of simultaneous thermogravimetry-differential thermal analysis (TG-DTA) in Example 5 and Comparative Example 3.

DESCRIPTION OF EMBODIMENTS

The present invention is described in more detail hereinafter.

Oxygen Reduction Catalyst

The oxygen reduction catalyst of the present invention is an oxygen reduction catalyst comprising composite particles, the composite particle comprising a carbon structure and particles each comprising a Group 4 metal element M1, the composite particle containing a Group 4 metal element M1, carbon, nitrogen and oxygen, the particles each comprising a Group 4 metal element M1 being dispersed in the carbon structure, and the composite particle exhibiting a specific TG-DTA pattern.

The carbon structure comprises, for example, crystalline carbon or amorphous carbon. In particular, the amorphous carbon has low thermal stability and tends to become carbon that is liable to undergo oxidation disappearance. The carbon structure may contain nitrogen or oxygen, and may have a functional group on the surface. The shape of the carbon structure is not specifically restricted. Pores may be present in the structure.

The particles comprising a Group 4 metal element M1 preferably contains carbon, nitrogen and oxygen. Further, the particles comprising a Group 4 metal element M1 preferably contains an iron group element M2.

A part or all of the particles each comprising a Group 4 metal element M1 are dispersed in the carbon structure, as shown in FIG. 1.

As described above, the composite particle is a particle containing the Group 4 metal M1, carbon, nitrogen and oxygen and comprising a carbon structure and the particles each of which comprises a Group 4 metal M1 and which are dispersed in the carbon structure.

The composite particle may contain an iron group element M2. The iron group element is iron, nickel or cobalt. When the composite particle contains an iron group element M2, the start-stop durability of the oxygen reduction catalyst comprising the composite particle is improved. As the iron group element M2, iron is preferable from the viewpoint of balance between cost and performance of the catalyst. The molar ratio of the M2 atom to the M1 atom (M2 atom/M1 atom) is preferably not more than 1.0, more preferably not more than 0.3, still more preferably 0.005 to 0.2.

The composite particle has a percentage of mass loss (a) and a percentage of mass loss (b), which are represented by the following formulas, of not more than 15% and 25 to 70%, respectively:

percentage of mass loss (*a*) (%)=(mass lost at 300 to 500° C.)/(mass at 300° C.)×100 percentage of mass loss (*b*) (%)=(mass lost at 300 to 800° C.)/(mass at 300° C.)×100 wherein each mass is a mass observed when the composite particle is subjected to simultaneous thermogravimetry-differential thermal analysis (TG-DTA) under the following conditions:

flow gas: air
gas flow rate: 0.2 L/min
temperature profile: the temperature is raised from 30° C. to 100° C. at a rate of 10° C./min, then maintained at 100° C. for 30 minutes, and then raised from 100° C. to 800° C. at a rate of 10° C./min.

The percentage of mass loss (a) is preferably not more than 10%, more preferably 3 to 10%. The percentage of mass loss (b) is preferably in the range of 25% to 65%.

It is thought that the mass lost at 300 to 500° C. and the mass lost at 300 to 800° C. are each mainly attributable to reduction of carbon in the carbon structure contained in the composite particle. It is presumed that the composite particle has a percentage of mass loss (a) smaller than that of a conventional oxygen reduction catalyst comprising a Group 4 metal M1, carbon, nitrogen and oxygen as constituent elements, and therefore has a small amount of carbon suffering oxidation corrosion in the start-stop operations of the fuel cell, so that the fuel cell using the composite particle as an oxygen reduction catalyst exhibits excellent start-stop durability.

On the other hand, if the percentage of mass loss (a) is higher than 15%, the amount of carbon suffering oxidation corrosion in the start-stop operations of the fuel cell is large, or if the percentage of mass loss (b) is higher than 70%, the amount of "carbon that hardly undergoes oxidation disappearance", namely, carbon that hardly undergoes oxidation disappearance but gradually suffers oxidation corrosion in the start-stop operations of the fuel cell, is increased, or if the percentage of mass loss (b) is lower than 25%, the amount of carbon that is a conductive material is too small, and in the catalyst layer of the fuel cell, the conduction path to carry electrons to the catalyst is liable to be broken. In every case, therefore, durability of the fuel cell using the composite particle as an oxygen reduction catalyst is lowered.

In the carbon structure, plural kinds of carbons different in thermal stability are contained, as previously described. In the present invention, carbon having relatively low thermal stability, which is decreased at a temperature of 300 to 500° C. in the measurement of a percentage of mass loss (a), and carbon having relatively high thermal stability, which is decreased at a temperature of higher than 500° C. but not higher than 800° C. in the measurement of a percentage of mass loss (b), are also referred to as "carbon that tends to undergo oxidation disappearance" and "carbon that hardly undergoes oxidation disappearance", respectively.

The specific surface area of the composite particle, as calculated by the BET method, is preferably not less than 50 $m^2/g$, more preferably 50 to 600 $m^2/g$, still more preferably 100 to 400 $m^2/g$, from the viewpoint that the noble metal particles that are fine particles are supported in a highly dispersed state.

The oxygen reduction catalyst of the present invention is preferably a supported catalyst in which a particle comprising a noble metal or an alloy of a noble metal (also referred to as a "noble metal particle" hereinafter) is further supported on the composite particle. When having the noble metal particle, the oxygen reduction catalyst of the present invention exhibits excellent durability in the start-stop durability test of a fuel cell and also exhibits good initial performance.

Examples of the noble metals in the present invention include platinum, gold, palladium, iridium, rhodium and ruthenium. Of these, at least one kind selected from platinum, palladium and iridium is preferable, and platinum is more preferable. Examples of the alloy of a noble metal include an alloy of the above noble metals or an alloy of the above noble metal and at least one metal selected from iron, nickel, chromium, cobalt, titanium, copper, vanadium and manganese. Of these, an alloy of platinum and at least one metal selected from iron, cobalt and nickel is particularly preferable.

The proportion of the noble metal in the oxygen reduction catalyst is preferably 5 to 50% by mass, more preferably 10 to 40% by mass. When containing the noble metal in such a proportion, the oxygen reduction catalyst of the present invention exhibits excellent initial performance in the start-stop durability test of a fuel cell and also exhibits good durability.

Production Process for Oxygen Reduction Catalyst

The oxygen reduction catalyst of the present invention can be produced by, for example, a process comprising:

a step of preparing a composite particle precursor containing a Group 4 metal element M1, carbon, nitrogen and oxygen and comprising a carbon structure and particles each of which comprises the Group 4 metal element M1 and which are dispersed in the carbon structure, and an oxidation step of bringing the composite particle precursor into contact with an oxidizing gas containing oxygen gas to oxidize and remove a part of carbon contained in the carbon structure.

In this production process for the oxygen reduction catalyst, the composite particle precursor is brought into contact with an oxidizing gas containing oxygen gas, whereby a part of carbon of the carbon structure contained in the composite particle precursor, at least a part of the "carbon that tends to undergo oxidation disappearance", is oxidized and removed.

<Step of Preparing Composite Particle Precursor>

The composite particle precursor can be produced by, for example, a process comprising:

a step 1 of mixing a compound (1) containing a Group 4 metal element M1, a nitrogen-containing organic compound (2), with the proviso that at least one of the compound (1) and the compound (2) contains an oxygen atom, and a solvent, or mixing the compound (1), the compound (2), a compound (3) containing an iron group metal M2, with the proviso that at least one of the compound (1), the compound (2) and the compound (3) contains an oxygen atom, and a solvent to obtain a raw material solution, a step 2 of removing the solvent from the raw material solution to obtain a solid residue, and a step 3 of heat-treating the solid residue obtained in the step 2 at a temperature of 700° C. to 1400° C. in a reducing atmosphere or an inert atmosphere to obtain a composite particle precursor.

(Step 1)

In the step 1, the compound (1) containing a Group 4 metal M1, the nitrogen-containing organic compound (2) and the solvent are mixed to obtain a raw material solution. When a composite particle containing an iron group element M2 is produced, a compound (3) containing at least one metal element M2 selected from iron, nickel and cobalt (also referred to as a "M2-containing compound (3)" hereinafter) as a compound containing an iron group element M2 is mixed together with the compound (1), the compound (2) and the solvent. The order of adding these materials is not specifically restricted.

In order to allow these compounds to smoothly react with one another, mixing is preferably carried out while the solvent is stirred. Mixing is usually carried out at room temperature, but when it is difficult to dissolve the compounds in the solvent, the solvent may be heated (heated to, for example, 40 to 80° C.). When heat generation abruptly occurs during the mixing, it is preferable to carry out mixing of them with cooling or to carry out mixing of them by portions.

Compound (1) Containing Group 4 Metal M1

The compound (1) containing a Group 4 metal M1 preferably contains at least one atom selected from an oxygen atom and a halogen atom. Specific examples thereof include a complex of the Group 4 metal M1, and a phosphate, a sulfate, a nitrate, an organic acid salt, an acid halide (intermediate hydrolyzate of halide), an alkoxide, an ester, a halide, a perhalogen acid salt and a hypohalous acid salt of the Group 4 metal M1. More preferable are an alkoxide, an ester, an acetylactone complex, a chloride, a bromide, an iodide, an acid chloride, an acid bromide, an acid iodide and a sulfate of the Group 4 metal M1. Still more preferable is an alkoxide or an acetylacetone complex of the Group 4 metal M1 from the viewpoint of solubility in the solvent of a liquid phase. These may be used singly or may be used in combination of two or more kinds.

In the case where the Group 4 metal 1 is titanium, specific examples of the compounds (1) containing a Group 4 metal M1 include:

titanium compounds, such as titanium tetramethoxide, titanium tetraethoxide, titanium tetrapropoxide, titanium tetraisopropoxide, titanium tetrabutoxide, titanium tetraisobutoxide, titanium tetrapentoxide, titanium tetraacetylacetonate, titanium oxydiacetylacetonate, bis[tris(2,4-pentanedionato)titanium(IV)] hexachlorotitanate(IV) ([Ti(acac)$_3$]$_2$[TiCl$_6$], wherein acac represents an acetonato ion), titanium tetrachloride, titanium trichloride, titanium oxychloride, titanium tetrabromide, titanium tribromide, titanium oxybromide, titanium tetraiodide, titanium triiodide and titanium oxyiodide. These may be used singly or may be used in combination of two or more kinds.

Compound (3) Containing Metal Element M2

When the composite particle contains the iron group element M2, the start-stop durability of the oxygen reduction catalyst is improved, as previously described.

Examples of the M2-containing compounds (3) include:

iron compounds, such as iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, iron ferrocyanide, iron (II) nitrate, iron (III) nitrate, iron(II) oxalate, iron(III) oxalate, iron(II) phosphate, iron(III) phosphate, ferrocene, iron(II) hydroxide, iron(III) hydroxide, iron(II) oxide, iron (III) oxide, triiron tetraoxide, iron(II) ammonium ethylenediaminetetraacetate, iron(II) acetate, iron(II) lactate and iron (III) citrate;

nickel compounds, such as nickel(II) chloride, nickel(II) sulfate, nickel(II) sulfide, nickel(II) nitrate, nickel(II) oxalate, nickel(II) phosphate, nickelocene, nickel(II) hydroxide, nickel(II) oxide, nickel(II) acetate and nickel(II) lactate; and cobalt compounds, such as cobalt(II) chloride, cobalt(III) chloride, cobalt(II) sulfate, cobalt(II) sulfide, cobalt(II) nitrate, cobalt(III) nitrate, cobalt(II) oxalate, cobalt(II) phosphate, cobaltocene, cobalt(II) hydroxide, cobalt(II) oxide, cobalt(III) oxide, tricobalt tetraoxide, cobalt(II) acetate and cobalt(II) lactate. These may be used singly or may be used in combination of two or more kinds.

When the ratio between the compound (1) containing a Group 4 metal M1 and the M2-containing compound (3) used in the step 1 is converted to a molar ratio (M1:M2) between the M1 atom and the atom of the metal element M2 and is represented by M1:M2=1:a, the range of a is preferably not more than 1.0, more preferably not more than 0.3, still more preferably 0.005 to 0.2.

Nitrogen-Containing Organic Compound (2)

The nitrogen-containing organic compound (2) is preferably a compound capable of becoming a ligand that can be coordinated to the Group 4 metal M1 atom in the compound (1) containing a Group 4 metal M1, and more preferably a compound capable of becoming a multidentate ligand (preferably a bidentate ligand or a tridentate ligand) (i.e., a compound capable of forming a chelate).

The nitrogen-containing organic compounds (2) may be used singly, or may be used in combination of two or more kinds.

The nitrogen-containing organic compound (2) preferably has a functional group, such as amino group, cyano group, nitro group, amide group, azide group, aziridine group, azo group, isocyanate group, isothiocyanate group, oxime group, diazo group and nitroso group, a ring, such as pyrrole ring, porphyrin ring, imidazole ring, pyridine ring, pyrimidine ring and pyrazine ring, an imide structure or an imine structure (these functional groups, rings and structures are together also referred to as "nitrogen-containing molecular groups").

It is thought that when having a nitrogen-containing molecular group in a molecule, the nitrogen-containing organic compound (2) can be coordinated to the M1 atom derived from the compound (1) containing a Group 4 metal M1 more strongly through the mixing in the step 1.

Of the aforesaid nitrogen-containing molecular groups, more preferable are amino group, imine group, amide group, pyrrole ring, pyridine ring and pyrazine ring, still more preferable are amino group, imine group, pyrrole ring and pyrazine ring, and particularly preferable are amino group and pyrazine ring because the oxygen reduction activity of the resulting composite particles is particularly enhanced.

The nitrogen-containing organic compound (2) preferably has a hydroxyl group, a carbonyl group, a formyl group, a halocarbonyl group, a sulfo group, a phosphoric acid group, a ketone structure, an ether structure or an ester structure (these are together also referred to as "oxygen-containing molecular groups"). It is thought that when having an oxygen-containing molecular group in a molecule, the nitrogen-containing organic compound (2) can be coordinated to the M1 atom derived from the compound (1) containing a Group 4 metal M1 and the M2 atom derived from the M2-containing compound (3) more strongly through the mixing in the step 1.

Of the oxygen-containing molecular groups, a carboxyl group and a formyl group are particularly preferable because the oxygen reduction activity of the resulting composite particles is particularly enhanced.

As the compounds having the nitrogen-containing molecular group and the oxygen-containing molecular group, amino acids having an amino group and a carboxyl group and their derivatives are preferable.

Examples of the amino acid preferably include alanine, arginine, asparagine, aspartic acid, cysteine, glutamine, glutamic acid, glycine, histidine, isoleucine, leucine, lysine, methionine, phenylalanine, serine, threonine, tryptophan, tyrosine, valine, norvaline, glycylglycine, triglycine and tetraglycine. In addition to the above amino acids, examples of the amino acid include acylpyrroles such as acetylpyrrole, pyrrolecarboxylic acid, acylimidazoles such as acetylimidazole, carbonyldiimidazole, imidazolecarboxylic acid, pyrazole, acetanilide, pyrazinecarboxylic acid, piperidinecarboxylic acid, piperazinecarboxylic acid, morpholine, pyrimidinecarboxylic acid, nicotinic acid, 2-pyridinecarboxylic acid, 2,4-pyridinedicarboxylic acid, 8-quinolinol and polyvinylpyrrolidone. Of these, compounds capable of becoming a bidentate ligand, specifically, pyrrole-2-carboxylic acid, imidazole-4-carboxylic acid, 2-pyrazinecarboxylic acid, 2-piperidinecarboxylic acid, 2-piperazinecarboxylic acid, nicotinic acid, 2-pyridinecarboxylic acid, 2,4-pyridinedicarboxylic acid and 8-quinolinol are preferable because the oxygen reduction activity of the resulting composite particles is high. Of the above compounds, alanine, glycine, lysine, methionine, tyrosine, 2-pyrazinecarboxylic acid and 2-pyridinecarboxylic acid are more preferable.

Solvent

Examples of the solvents include water, acetic acid, acetylacetone, alcohols and mixed solvents thereof. As the alcohols, ethanol, methanol, butanol, propanol and ethoxyethanol are preferable, and ethanol and methanol are more preferable. In order to enhance dissolution property, it is preferable to add an acid to the solvent. As the acids, acetic acid, nitric acid, hydrochloric acid, phosphoric acid and citric acid are preferable, and acetic acid and nitric acid are more preferable. These may be used singly or may be used in combination of two or more kinds.

(Step 2)

In the step 2, the solvent is removed from the raw material solution obtained in the step 1 to obtain a solid residue. The method to remove the solvent is not specifically restricted. Examples of the method include a method using a spray dryer, a rotary evaporator or the like.

The composition or the aggregation state of the solid residue obtained in the step 2 is sometimes non-uniform depending upon the method for removing the solvent or the property of the compound (1) containing a Group 4 metal M1, the M2-containing compound (3) or the nitrogen-containing organic compound (2). In such a case, the solid residue may be subjected to crushing to obtain more uniform and finer powder to be used in the step 3, whereby a composite particle precursor having more uniform particle diameters can be obtained. In the present specification, operations to finely divide the substance to be treated, such as crushing and cracking, are described as "crushing" without particularly distinguishing them. By carrying out such crushing, processability in the production of an electrode using the resulting oxygen reduction catalyst and properties of the resulting electrode can be sometimes improved. For the crushing, for example, a roll rolling mill, a ball mill, a small-diameter ball mill (bead mill), a medium stirring mill, an airflow pulverizer, a mortar, an automatic kneading mortar, a tank crusher or a jet mill can be used.

Examples of a method to crush a solid residue include a method using a mortar, an automatic kneading mortar or a ball mill. When the amount of the solid residue is large and continuous crushing is carried out, examples of the method include a method of using a jet mill or the like.

(Step 3)

In the step 3, the solid residue obtained in the step 2 is heat-treated at a temperature of 700° C. to 1400° C. in a reducing atmosphere or an inert atmosphere to obtain a composite particle precursor.

As the surrounding gas for carrying out the heat treatment, a reducing gas or an inert gas is preferably used. As the reducing gas, hydrogen gas is preferable from the viewpoint that it is relatively inexpensive and easily obtainable. As the inert gas, nitrogen gas, argon or helium is preferable from the viewpoint that it is relatively inexpensive and easily obtainable. These may be used singly, or may be used by mixing two or more kinds of them. When two or more kinds of them are mixed, it is preferable to combine one kind selected from nitrogen gas, argon gas and helium with hydrogen gas.

When hydrogen gas is contained in an atmosphere of the heat treatment, the concentration of hydrogen gas is, for example, not more than 100% by volume, preferably 1 to 20% by volume, more preferably 1 to 5% by volume.

The composite particle precursor obtained by the heat treatment may be used as it is in the next oxidation step, or may be used in the oxidation treatment after it is further crushed.

The temperature of the heat treatment in the step 3 is 700 to 1400° C.

The composite particle precursor contains a Group 4 metal element M1, carbon, nitrogen and oxygen and comprises a carbon structure and particles each of which comprises the Group 4 metal element M1 and which are dispersed in the carbon structure. It is presumed that through the step 1 to the step 3, thermal decomposition of the nitrogen-containing organic compound (2) proceeds in such a state that the metal element M1 and nitrogen of the nitrogen-containing organic compound have their mutual chemical interaction; and therefore, a composite particle precursor containing a Group 4 metal element M1, carbon, nitrogen and oxygen and comprising a carbon structure and particles each of which comprises the Group 4 metal element M1 and which are dispersed in the carbon structure is obtained. Since nitrogen, carbon and oxygen are contained in the composite particle precursor, effects such as increase of catalytically active sites in the resulting composite particles and enhancement of conductivity is expected.

<Oxidation Step>

In the oxidation step, the composite particle precursor is brought into contact with an oxidizing gas containing oxygen gas, whereby a part of carbon contained in the carbon structure is oxidized and removed. By carrying out such treatment, an oxygen reduction catalyst comprising the composite particle and having a percentage of mass loss (a) ((mass lost at 300 to 500° C.)/(mass at 300° C.)×100) and a percentage of mass loss (b) ((mass lost at 300 to 800° C.)/(mass at 300° C.)×100) of not more than 15% and 25 to 70%, respectively, can be produced.

The oxidizing gas may contain oxygen gas in an amount of 1 to 100% by volume, and may be, for example, air. The gas other than oxygen gas, which is contained in the oxidizing gas, is not specifically restricted, and is preferably nitrogen gas, argon or helium.

The temperature in the oxidation step is preferably in the range of 200 to 600° C., more preferably 300 to 500° C. As long as the temperature is in this range, the temperature may be kept constant or may be changed. After the step 3, the system may be cooled to adjust the temperature to this range, or after the step 3, the system may be cooled down to a temperature in the vicinity of room temperature and the temperature may be adjusted to this range. When the temperature in the oxidation step is raised from a temperature in the vicinity of room temperature to a temperature in the above range by heating the system, the heating rate in the oxidation treatment is not specifically restricted, and it is preferably 1 to 100° C./min, more preferably 1 to 50° C./min, still more preferably 10 to 50° C./min.

The time required for the oxidation step is, for example, 10 minutes to 24 hours. The time is preferably 20 minutes to 10 hours, more preferably 30 minutes to 5 hours, still more preferably 30 minutes to 2 hours. However, the upper limit of the time for the oxidation step may be 24 hours or more as long as there is no problem in the performance of the catalyst.

By carrying out the oxidation step, the amount of the "carbon that tends to undergo oxidation disappearance" contained in the composite particle precursor can be decreased. However, excessive oxidation treatment (such oxidation treatment as produces composite particles having a percentage of mass loss (b) of lower than 25%) excessively decrease the total amount of carbon contained in the composite particle precursor, and as a result, lowering of conductivity of the composite particle, excessive lowering of a specific surface area thereof, or the like are brought about, so that such oxidation treatment is undesirable. The extent of oxidation can be raised by elevating the temperature of the oxidation step, lengthening the time of the oxidation step or raising the concentration of oxygen gas in the oxidation step.

In the patent literature 6, it is described that when acetylene black is subjected to oxidation treatment, the specific surface area is increased. On the other hand, in the present invention wherein the composite particle precursor containing the metal M1 and carbon is subjected to oxidation treatment, the specific surface area is decreased contrarily. At this point, the patent literature 6 and the present invention differ from each other in properties of the product.

[Supporting of Noble Metal Particle]

As previously described, the oxygen reduction catalyst of the present invention may be a supported catalyst in which the noble metal particle is supported on the composite particle.

The method for supporting the noble metal particle on the composite particle is not specifically restricted, and is preferably a method of allowing the composite particle to support the noble metal particle using a noble metal particle precursor is preferable.

The noble metal particle precursor is a substance capable of becoming the noble metal particle through a given treatment, and examples thereof include chloroplatinic acid, iridium chloride, palladium chloride and mixtures thereof.

Examples of the above methods include (1) a method comprising a step of mixing the noble metal particle precursor and the composite particle in a solution and carrying out evaporation to dryness of the mixture and a step of carrying out heat treatment thereafter, (2) a method comprising a step of dispersing the composite particle in a colloidal solution of the noble metal particle precursor to allow the composite particle to adsorb the colloidal particles of the noble metal particle precursor, and calcining them to allow the composite particle to support noble metal particle thereon, and (3) a method comprising a step of mixing a solution containing one or more kinds of noble metal particle precursors and a dispersion of the composite particles and adjusting pH of the resulting mixture to obtain an oxide or a hydroxide of the noble metal and simultaneously to allow the composite particle to adsorb the oxide or the hydroxide, a step of reducing the oxide or the hydroxide, and if necessary, a step of heat-treating the resulting substance.

Uses

Uses of the oxygen reduction catalyst of the present invention are not specifically restricted. The oxygen reduction catalyst can be preferably used as an electrode catalyst for a fuel cell, an electrode catalyst for an air cell, or the like. When the oxygen reduction catalyst is used as an electrode catalyst for a fuel cell, the hydrogen source is not specifically restricted.

The oxygen reduction catalyst of the present invention can be used as a substitutive catalyst for a conventional platinum-supported carbon catalyst.

(Fuel Cell Catalyst Layer)

The fuel cell catalyst layer of the present invention comprises the oxygen reduction catalyst.

The fuel cell catalyst layers include an anode catalyst layer and a cathode catalyst layer. Since the oxygen reduction catalyst has excellent durability and high oxygen reduction ability, it is preferably used for a cathode catalyst layer.

In order to reduce electric resistance more, the fuel cell catalyst layer may further comprise electron conductive particles.

Examples of materials of the electron conductive particles include carbon, a conductive polymer, a conductive ceramic, a metal and a conductive inorganic oxide such as tungsten oxide or iridium oxide. These may be used singly or in combination of two or more kinds. In particular, electron conductive particles made of carbon have large specific surface area, those of small particle diameters are inexpensively and easily obtainable, and they are excellent in chemical resistance. Therefore, carbon alone or a mixture of carbon and other electron conductive particles is preferable.

Examples of carbons include carbon black, graphite, activated carbon, carbon nanotube, carbon nanofiber, carbon nanohorn, fullerene, porous carbon and graphene. If the diameters of the electron conductive particles made of carbon are too small, it becomes difficult to form an electron conduction path, and if they are too large, lowering of gas diffusion property of the fuel cell catalyst layer or lowering of utilization ratio of the catalyst tends to occur. Therefore, the particle diameters are preferably 10 to 1000 nm, more preferably 10 to 100 nm.

When the electron conductive particles are made of carbon, the mass ratio between the oxygen reduction catalyst and the electron conductive particles (catalyst:electron conductive particles) is preferably 1:1 to 100:1.

The fuel cell catalyst layer usually comprises a polymer electrolyte. The polymer electrolyte is not specifically restricted provided that it is a polymer electrolyte generally used. Specific examples thereof include a perfluorocarbon polymer having a sulfonic acid group (e.g., NAFION (registered trademark)), a hydrocarbon-based polymer compound having a sulfonic acid group, a polymer compound doped with an inorganic acid such as phosphoric acid, an organic/inorganic hybrid polymer a part of which has been substituted by a proton conductive functional group, and a proton conductor wherein a polymer matrix is impregnated with a phosphoric acid solution or a sulfuric acid solution. Of these, NAFION is preferable. Examples of a source of supply of NAFION in the formation of the fuel cell catalyst layer include a 5% NAFION solution (DE521, manufactured by Du Pont) or the like.

The method to form the fuel cell catalyst layer is not specifically restricted. Examples of the method include a method comprising coating an electrolyte membrane or a gas diffusion layer with a suspension in which materials for constituting the aforesaid fuel cell catalyst layer are dispersed in a solvent and then drying the suspension. Examples of the coating methods include dipping, screen printing, roll coating, spraying and bar coater method. Further, the method to form the fuel cell catalyst layer may also be a method comprising forming a catalyst layer for a fuel cell on a substrate by a coating method or a filtration method using a suspension in which materials for constituting the aforesaid fuel cell catalyst layer are dispersed in a solvent and then transferring the resulting layer onto an electrolyte membrane to form a catalyst layer for a fuel cell.

(Electrode)

The electrode of the present invention comprises the fuel cell catalyst layer and a gas diffusion layer.

The gas diffusion layer is a layer that is porous and helps diffusion of a gas. As a material of the gas diffusion layer, any material may be used provided that it has electronic conductivity, has high gas diffusion property and has high corrosion resistance. In general, a carbon-based porous material, such as carbon paper or carbon cloth, or an aluminum foil having been covered with stainless steel or an anti-corrosion material for the purpose of lightening is used.

(Membrane Electrode Assembly)

The membrane electrode assembly of the present invention is a membrane electrode assembly having a cathode catalyst layer, an anode catalyst layer and an electrolyte membrane arranged between these catalyst layers. The cathode catalyst layer and/or the anode catalyst layer is the fuel cell catalyst layer of the present invention. The membrane electrode assembly may have a gas diffusion layer. When the fuel cell catalyst layer of the present invention is used as the cathode catalyst layer, a hitherto publicly known catalyst layer for a fuel cell, such as a catalyst layer for a fuel cell that comprises a platinum-supported carbon catalyst instead of the oxygen reduction catalyst, can be used as the anode catalyst layer.

As the polymer electrolyte membrane, for example, a polymer electrolyte membrane using a perfluorosulfonic acid-based polymer or a polymer electrolyte membrane using a hydrocarbon-based polymer is generally used, and a membrane wherein a polymer fine-porous membrane is impregnated with a liquid electrolyte, a membrane wherein a porous body is filled with a polymer electrolyte, or the like may be also used.

The membrane electrode assembly can be obtained by, for example, preparing a gas diffusion layer having a cathode layer formed on the surface and a gas diffusion layer having an anode layer formed on the surface, then interposing an electrolyte membrane between these gas diffusion layers in such a manner that the cathode catalyst layer and the anode catalyst layer are positioned on the inner sides, and hot pressing them.

Since the membrane electrode assembly has high catalytic ability and high catalyst durability, it can be preferably used for a fuel cell or an air cell.

Fuel cells are classified according to a difference of the electrolyte used or the like, into several categories such as molten carbonate fuel cell (MCFC), phosphoric acid fuel cell (PAFC), solid oxide fuel cell (SOFC), polymer electrolyte fuel cell (PEFC), and the like. The membrane electrode assembly of the present invention is preferably used in the polymer electrolyte fuel cell among them, and as a fuel, hydrogen, methanol or the like can be used.

[Fuel Cell]

The fuel cell of the present invention has the above-mentioned membrane electrode assembly.

The fuel cell of the present invention using the oxygen reduction catalyst exhibits high performance and is excellent in start-stop durability. Further, the fuel cell of the present invention is more inexpensive than a fuel cell using a conventional platinum-supported carbon catalyst. This fuel cell can enhance performance of articles equipped with a fuel cell and having at least one function selected from the group consisting of power generation function, light emission function, heat generation function, sound generation function, motor function, display function and charging function.

<Specific Examples of Articles Equipped with the Fuel Cell>

Specific examples of the articles which can be equipped with the fuel cell include architectural structures, such as buildings, houses and tents, lighting equipments, such as fluorescent lamps, LED, organic EL, street lamps, interior illuminations and traffic lights, machinery, automotive devices including vehicles themselves, home appliances, agricultural equipments, electronic equipments, personal digital assistants including cellular phones, beauty equipments, hand-held machine tools, sanitary fixtures, such as bath articles and toilet articles, furniture, toys, ornaments, bulletin boards, cooler boxes, outdoor articles such as outdoor generators, teaching materials, artificial flowers, art objects, power sources of heart pacemakers, and power sources for heating or cooling devices equipped with Peltier element.

EXAMPLES

The present invention is described in more detail with reference to the following examples, but it should be construed that the present invention is in no way limited to those examples. Various measurements in the examples and the comparative examples were carried out by the following methods.

<Analytical Methods>

1. Simultaneous Thermogravimetry-Differential Thermal Analysis (TG-DTA)

About 0.01 g of a sample was weighed in a platinum cell at room temperature, and TG-DTA was carried out under the following conditions using SII TG/DTA320.

Flow gas: air
Gas flow rate: 0.2 L/min
Temperature profile:
raised from 30 to 100° C. at a rate of 10° C./min
maintained at 100° C. for 30 minutes
raised from 100 to 800° C. at a rate of 10° C./min Based on the measurement results, a percentage of mass loss (a) (also referred to as a "mass loss at 300 to 500° C.") and a percentage of mass loss (b) (also referred to as a "mass loss at 300 to 800° C.") defined by the following formulas were calculated.

Percentage of mass loss ($a$) (%)=(mass of sample lost at 300 to 500° C.)/(mass of sample at 300° C.)×100

Percentage of mass loss ($b$) (%)=(mass of sample lost at 300 to 800° C.)/(mass of sample at 300° C.)×100

2. Measurement of BET Specific Surface Area

A sample of 0.15 g was collected, and measurement of a specific surface area was carried out by a fully automatic BET specific surface area measuring device Macsorb (manufactured by Mountech Co., Ltd.). The pretreatment time and the pretreatment temperature were set to 30 minutes and 200° C., respectively.

3. Transmission Electron Microscope Observation

Transmission electron microscope (TEM) observation was carried out using H9500 (acceleration voltage: 300 kV) manufactured by Hitachi, Ltd. The observation sample was prepared by dropping a dispersion obtained by ultrasonically dispersing a sample powder in ethanol, on a microgrid for TEM observation.

<Production of Catalyst and Evaluation Thereof>

Example 1

1-1. Step of Preparing Composite Particle Precursor

To a solution of 15 mL of ethanol (manufactured by Wako Pure Chemical Industries, Ltd.) and 5 mL of acetic acid (manufactured by Wako Pure Chemical Industries, Ltd.), 5 mL of titanium tetraisopropoxide (manufactured by Junsei Chemical Co., Ltd.) and 5 mL of acetylacetone (manufactured by Junsei Chemical Co., Ltd.) were added, and they were stirred at room temperature to prepare a titanium-containing mixture solution. Further, to 20 mL of pure water, 3.76 g of glycine (manufactured by Wako Pure Chemical Industries, Ltd.) and 0.31 g of iron(II) acetate (manufactured by Aldrich) were added, and they were stirred at room temperature to completely dissolve glycine, whereby a glycine-containing mixture solution was prepared. The titanium-containing mixture solution was slowly added to the glycine-containing mixture solution to obtain a transparent catalyst precursor solution. The solvent was slowly evaporated using a rotary evaporator while the temperature of a water bath was set to about 80° C. and the catalyst precursor solution was heated and stirred. A solid residue obtained by completely evaporating the solvent was finely and uniformly ground by a mortar to obtain a powder.

This powder was placed in a tubular furnace, heated up to 900° C. at a heating rate of 10° C./rain in an atmosphere of a mixed gas consisting of hydrogen gas and nitrogen gas and containing 4% by volume of hydrogen gas, and heat-treated at 900° C. for 1 hour. The resulting heat-treated product was subjected to planetary ball milling in isopropanol (manufactured by Junsei Chemical Co., Ltd.), then filtered and dried to obtain a powder.

3.00 g of the resulting powder and 300 mL of concentrated hydrochloric acid were mixed and stirred at room temperature for 6 hours. Thereafter, the mixture was filtered and dried to obtain a powder (composite particle precursor).

1-2. Oxidation Step

The resulting powder was placed in a tubular furnace, heated up to 400° C. at a heating rate of 10° C./min in an air atmosphere and maintained at 400° C. for 30 minutes to perform heat treatment, whereby composite particles (also referred to as "catalyst (1)" hereinafter) were obtained.

Example 2

A catalyst (2) was obtained in the same manner as in Example 1, except that the temperature and the time for the heat treatment in "1-2. Oxidation step" were changed to 400° C. and 60 minutes, respectively.

Example 3

A catalyst (3) was obtained in the same manner as in Example 1, except that the temperature and the time for the heat treatment in "1-2. Oxidation step" were changed to 400° C. and 120 minutes, respectively.

Example 4

A catalyst (4) was obtained in the same manner as in Example 1, except that the amount of glycine in "1-1. Step of preparing composite particle precursor" was changed to 3 times (11.28 g) that in Example 1.

Comparative Example 1

A catalyst (5) was obtained in the same manner as in Example 1, except that the "1-2. Oxidation step" was not carried out. That is to say, the powder obtained in "1-1. Preparation of composite particle precursor" of Example 1 was used as a catalyst (5).

Comparative Example 2

In accordance with the method described in paragraphs [0090] to [0097] (Example 1) of the patent literature 1, a polyacrylonitrile/polymethacrylic acid copolymer and cobalt chloride hexahydrate were mixed, then carbonization treatment and acid treatment were carried out in order, then purging with nitrogen (nitrogen flow rate: 0.7 L/min) was carried out for 20 minutes, and thereafter an oxidation treatment was performed while the system was maintained at 700° C. for 1 hour. The resulting powder was used as a catalyst (6).

The catalyst (1) to the catalyst (6) were subjected to simultaneous thermogravimetry-differential thermal analysis (TG-DTA), and a proportion of decrease in mass at 300 to 500° C. (percentage of mass loss (a)) and a proportion of decrease in mass at 300 to 800° C. (percentage of mass loss (b)) were determined. The results are set forth in Table 1.

TABLE 1

|  |  | Percentage of mass loss (a) (%) | Percentage of mass loss (b) (%) | BET specific surface area (m$^2$/g) |
| --- | --- | --- | --- | --- |
| Ex. 1 | catalyst (1) | 10 | 33 | 178 |
| Ex. 2 | catalyst (2) | 6 | 29 | 123 |
| Ex. 3 | catalyst (3) | 4 | 26 | 96 |
| Ex. 4 | catalyst (4) | 9 | 65 | 117 |
| Comp. Ex. 1 | catalyst (5) | 20 | 40 | 204 |
| Comp. Ex. 2 | catalyst (6) | 5 | 95 | 178 |

Example 5

To 900 ml of distilled water, 1.00 g of the catalyst (1) and 260 mg of sodium carbonate (manufactured by Wako Pure Chemical Industries, Ltd.) were added, and they were shaken for 30 minutes by an ultrasonic washing machine. The liquid temperature of this suspension was maintained at 80° C. in a water bath, and the suspension was stirred for 30 minutes. To the suspension, distilled water containing 0.475 g (corresponding to 0.180 g of platinum) of chloroplatinic acid hexahydrate (manufactured by Wako Pure Chemical Industries, Ltd.) was dropwise added over a period of 10 minutes (the liquid temperature was maintained at 80° C.). Thereafter, stirring was carried out for 2 hours while the liquid temperature was maintained at 80° C. Next, to the resulting suspension, 15.5 ml of a 37% formaldehyde aqueous solution (manufactured by Wako Pure Chemical Industries, Ltd.) was dropwise added over a period of 5 minutes. Thereafter, stirring was carried out for 1 hour while the liquid temperature was maintained at 80° C. The resulting suspension was cooled and filtered to obtain a black powder.

The resulting black powder was dried, then placed in a tubular furnace, heated up to 800° C. at a heating rate of 10° C./min in an atmosphere of a mixed gas consisting of hydrogen gas and nitrogen gas and containing 4% by volume of hydrogen gas, and heat-treated at 800° C. for 1 hour to obtain a powder (also referred to as a "supported catalyst (1)" hereinafter). The platinum content in the supported catalyst (1) was 15% by mass.

Examples 6 to 8, Comparative Examples 3 and 4

Supported catalysts (2) to (6) were obtained in the same manner as in Example 5, except that the catalyst (1) was replaced with 1.00 g of each one of the catalysts (2) to (6).

Comparative Example 5

A platinum-supported carbon catalyst (TEC10E50E) manufactured by Tanaka Kikinzoku Kogyo K.K. was used as a supported catalyst (7).

Example 9

To 900 ml of distilled water, 1.00 g of the catalyst (1) was added, and they were shaken for 30 minutes by an ultrasonic washing machine. The liquid temperature of this suspension was maintained at 80° C. in a water bath, and the suspension was stirred for 30 minutes. To the suspension, a 0.2 M NaOH aqueous solution was added to adjust pH of the liquid to 7.0.

Thereafter, distilled water containing 0.475 g (corresponding to 0.180 g of platinum) of chloroplatinic acid hexahydrate (manufactured by Wako Pure Chemical Industries, Ltd.) and 0.077 g (corresponding to 0.018 g of cobalt) of cobalt (II) acetate (manufactured by Wako Pure Chemical Industries, Ltd.) was dropwise added over a period of 20 minutes. During the dropwise addition, the liquid temperature was maintained at 80° C., and the pH of the liquid was maintained at 7.0. Thereafter, stirring was carried out for 2 hours while the liquid temperature and the pH were maintained at 80° C. and at 7.0, respectively. Next, to the resulting suspension, distilled water containing 0.550 g of NaBH$_4$ (manufactured by Wako Pure Chemical Industries, Ltd.) was dropwise added over a period of 10 minutes. Thereafter, stirring was carried out for 1 hour while the liquid temperature was maintained at 80° C. The resulting suspension was cooled and filtered to obtain a black powder.

The resulting black powder was dried, then placed in a tubular furnace, heated up to 600° C. at a heating rate of 10° C./min in an atmosphere of a mixed gas consisting of hydrogen gas and nitrogen gas and containing 4% by volume of hydrogen, and heat-treated at 600° C. for 1 hour to obtain a powder (also referred to as a "supported catalyst (8)" hereinafter). The Pt content and the Co content in the supported catalyst (8) were 15% by mass and 1.5% by mass, respectively.

Example 10

A supported catalyst (9) was obtained in the same manner as in Example 9, except that the catalyst (1) was replaced with 1.00 g of the catalyst (2).

<Production of Membrane Electrode Assembly for Fuel Cell and Evaluation of Generation Property Thereof>

1. Preparation of Cathode Having Catalyst Layer for Fuel Cell

The supported catalyst (1), an aqueous solution (5% NAFION (NAFION aqueous solution, manufactured by Wako Pure Chemical Industries, Ltd.)) containing a proton conductive material (NAFION), pure water and isopropanol (manufactured by Junsei Chemical Co., Ltd.) were mixed, and the mixture was subjected to ultrasonic irradiation in ice water to prepare an ink (1) for cathode.

Next, a surface of a gas diffusion substrate (GDL) for a fuel cell, said substrate having a size of 5 cm×5 cm, was coated with the ink (1) for cathode at 80° C. by the use of an automatic spray coating device (manufactured by SAN-EI TECH Ltd.) to prepare an electrode (also referred to as a "cathode (1)" hereinafter) having, on the GDL surface, a cathode catalyst layer (1) in which the total amount of the supported catalyst (1) per unit area was 0.67 mg/cm$^2$.

2. Preparation of Anode Having Catalyst Layer for Fuel Cell

In an ultrasonic dispersing machine, a platinum-supported carbon catalyst (TEC10E70TPM manufactured by Tanaka Kikinzoku Kogyo K.K.), an aqueous solution (5% NAFION (NAFION aqueous solution, manufactured by Wako Pure Chemical Industries, Ltd.)) containing a proton conductive material (NAFION) and pure water were placed and mixed for 1 hour to prepare an ink (1) for anode.

Next, a surface of the aforesaid GDL having a size of 5 cm×5 cm was coated with the ink (1) for anode at 80° C. by the use of an automatic spray coating device (manufactured by SAN-EI TECH Ltd.) to prepare an electrode (also referred to as an "anode (1)" hereinafter) having, on the GDL surface, an anode catalyst layer in which the total amount of the platinum-supported carbon catalyst per unit area was 1.00 mg/cm$^2$.

3. Preparation of Membrane Electrode Assembly for Fuel Cell

A NAFION membrane (NR-212, manufactured by Du Pont), the cathode (1) and the anode (1) were prepared as an electrolyte membrane, a cathode and an anode, respectively.

A membrane electrode assembly for a fuel cell (also referred to as "MEA" hereinafter), which had the electrolyte membrane arranged between the cathode and the anode, was prepared in the following manner.

The electrolyte membrane was interposed between the cathode (1) and the anode (1), and they were subjected to thermocompression bonding at a temperature of 140° C. and a pressure of 1 MPa over 7 minutes by the use of a hot press in such a way that the cathode catalyst layer (1) and the anode catalyst layer (1) came into close contact with the electrolyte membrane, whereby MEA (1) was prepared.

The MEA (1) was interposed between two sealing materials (gaskets), two separators with gas flow path, two collectors and two rubber heaters and fixed to them with a bolt, and they were clamped so as to obtain a given contact pressure (4 N), whereby a unit cell (also referred to as a "unit cell (1)" hereinafter) (cell area: 5 cm$^2$) of a polymer electrolyte fuel cell was prepared.

Unit cells (2) to (9) were prepared by the same process as the preparation process for the unit cell (1), except that the supported catalyst (1) was replaced with each one of the supported catalysts (2) to (9).

4. Start-Stop Durability Test

The unit cell (1), an anode humidifier and a cathode humidifier were temperature-controlled to 80° C., 80° C. and 80° C., respectively. Thereafter, hydrogen was supplied to the anode side as a fuel, air was supplied to the cathode side, and current-voltage (I-V) properties of the unit cell (1) were evaluated.

Thereafter, in such a state that the unit cell (1), the anode humidifier and the cathode humidifier had been temperature-controlled to 80° C., 80° C. and 80° C., respectively, such a triangle wave potential cycle composed of 1.0V-1.5V and 1.5V-1.0V as shown in FIG. 4 was applied 4,000 times while hydrogen gas was supplied to the anode side and nitrogen gas was supplied to the cathode side.

After the triangle wave potential cycle was applied 4,000 times, I-V measurement was carried out under the aforesaid conditions.

Using the unit cell (2) to the unit cell (9), the same start-stop tests as above were carried out.

5. Start-Stop Test of Membrane Electrode Assembly for Fuel Cell

A ratio (%) of a voltage value at 0.3 A/cm$^2$ obtained from the I-V measurement after the triangle wave potential cycle was applied 4000 times in the above start-stop test to a voltage value at 0.3 A/cm$^2$ obtained from the I-V measurement before the triangle wave potential cycle was applied (also referred to as an "initial voltage" hereinafter) was defined as a voltage retention ratio.

In I-V properties of a fuel cell, a voltage value at a certain current density is regarded as an indication of performance of the fuel cell. That is to say, a higher initial voltage means higher initial performance of a fuel cell, and this furthermore indicates that the activity of an oxygen reduction catalyst is higher. Moreover, a higher voltage retention ratio indicates higher start-stop durability of not only a fuel cell but also an oxygen reduction catalyst.

With regard to the unit cell (1) and the unit cell (5) as representatives, a relationship between the number of start-stop operations and the cell voltage is shown in FIG. 4. The unit cell (1) exhibits a higher voltage than the unit cell (5) when the number of the start-stop operations was 4000.

A relationship between the decrease in mass at 300 to 500° C. in TG-DTA and the voltage retention ratio at 0.3 A/cm$^2$ after the triangle wave potential cycle was applied 4000 times, which was obtained in the start-stop test, is shown in FIG. 5 and Table 2.

The unit cells (1) to (4) (Examples 5 to 8) exhibited better start-stop durability as compared with the unit cells (5) and (6) (Comparative Examples 3 and 4), which are the same in conditions for supporting noble metal particles. From this result, it is thought that even in the case of unit cells using only composite particles having no precious metal particles supported, the unit cells using the composite particles (1) to (4) (Examples 1 to 4) exhibited better start-stop durability as compared with the unit cells using the composite particles (5) and (6) (Comparative Examples 1 and 2).

The unit cells (8) and (9) also exhibited good start-stop durability similarly to the unit cells (1) to (4), though they were different from the unit cell (1), etc. in the conditions for supporting noble metal particles.

TABLE 2

| | | Composite particle | | | | |
| --- | --- | --- | --- | --- | --- | --- |
| | | Percentage of mass loss (a) (%) (mass loss at 300-500° C.) | Percentage of mass loss (b) (%) (mass loss at 300-800° C.) | Supported catalyst | Unit cell | Voltage retention ratio (%) |
| Comp. Ex. 3 | catalyst (5) of Comp. Ex. 1 | 20 | 40 | (5) | (5) | 87 |
| Comp. Ex. 4 | catalyst (6) of Comp. Ex. 2 | 5 | 95 | (6) | (6) | 85 |
| Comp. Ex. 5 | (*1) | 0 | 100 | (7) | (7) | 70 |
| Ex. 5 | catalyst (1) of Ex. 1 | 10 | 33 | (1) | (1) | 92 |
| Ex. 6 | catalyst (2) of Ex. 2 | 6 | 29 | (2) | (2) | 93 |
| Ex. 7 | catalyst (3) of Ex. 3 | 4 | 26 | (3) | (3) | 95 |
| Ex. 8 | catalyst (4) of Ex. 4 | 9 | 65 | (4) | (4) | 95 |
| Ex. 9 | catalyst (1) of Ex. 1 | 10 | 33 | (8) | (8) | 90 |

TABLE 2-continued

| | | Composite particle | | | | |
|---|---|---|---|---|---|---|
| | | Percentage of mass loss (a) (%) (mass loss at 300-500° C.) | Percentage of mass loss (b) (%) (mass loss at 300-800° C.) | Supported catalyst | Unit cell | Voltage retention ratio (%) |
| Ex. 10 | catalyst (2) of Ex. 2 | 6 | 29 | (9) | (9) | 92 |

(*1) platinum-supported carbon catalyst manufactured by Tanaka Kikinzoku Kogyo K.K. (TEC10E50E)

The invention claimed is:

1. An oxygen reduction catalyst comprising a composite particle,
the composite particle comprising a carbon structure and particles each comprising a Group 4 metal element M1,
the composite particle containing a Group 4 metal element M1, carbon, nitrogen and oxygen,
the particles each comprising a Group 4 metal element M1 being dispersed in the carbon structure, and
the composite particle having a percentage of mass loss (a) and a percentage of mass loss (b), which are represented by the following formulae, of not more than 15% and 25 to 70%, respectively:

percentage of mass loss (*a*) (%)=(mass lost at 300 to 500° C.)/(mass at 300° C.)×100 percentage of mass loss (*b*) (%)=(mass lost at 300 to 800° C.)/(mass at 300° C.)×100 wherein each mass is a mass observed when the composite particle is subjected to simultaneous thermogravimetry-differential thermal analysis (TG-DTA) under the following conditions:
flow gas: air
gas flow rate: 0.2 L/min
temperature profile: the temperature is raised from 30° C. to 100° C. at a rate of 10° C./min, then maintained at 100° C. for 30 minutes, and then raised from 100° C. to 800° C. at a rate of 10° C./min.

2. The oxygen reduction catalyst as claimed in claim 1, wherein the Group 4 metal element M1 is titanium.

3. The oxygen reduction catalyst as claimed in claim 1, wherein the particles each comprising a Group 4 metal element M1 further contains an iron group metal element M2.

4. The oxygen reduction catalyst as claimed in claim 1, which is used in an oxygen reduction reaction of a fuel cell.

5. The oxygen reduction catalyst as claimed in claim 1, which is used in a reaction for converting oxygen into water.

6. A catalyst layer comprising the oxygen reduction catalyst as claimed in claim 1.

7. An electrode having the catalyst layer as claimed in claim 6.

8. A membrane electrode assembly having a cathode, an anode and a polymer electrolyte membrane arranged between the cathode and the anode, wherein the cathode and/or the anode is the electrode as claimed in claim 7.

9. A fuel cell having the membrane electrode assembly as claimed in claim 8.

10. A process for producing the oxygen reduction catalyst as claimed in claim 1, the process comprising a step of preparing a composite particle precursor containing a Group 4 metal element M1, carbon, nitrogen and oxygen and comprising a carbon structure and particles each of which comprises the Group 4 metal element M1 and which are dispersed in the carbon structure, and
an oxidation step of bringing the composite particle precursor into contact with an oxidizing gas containing oxygen gas to oxidize and remove a part of carbon contained in the carbon structure;
wherein the step of preparing a composite particle precursor comprises:
a step 1 of
mixing a compound (1) containing a Group 4 metal element M1, a nitrogen-containing organic compound (2), with the proviso that at least one of the compound (1) and the compound (2) contains an oxygen atom, and a solvent, or
mixing the compound (1), the compound (2), a compound (3) containing an iron group metal element M2, with the proviso that at least one of the compound (1), the compound (2) and the compound (3) contains an oxygen atom, and a solvent to obtain a raw material solution,
a step 2 of removing the solvent from the raw material solution to obtain a solid residue, and
a step 3 of heat-treating the solid residue obtained in the step 2 at a temperature of 700° C. to 1400° C. in a reducing atmosphere or an inert atmosphere to obtain a composite particle precursor.

11. The process for producing the oxygen reduction catalyst as claimed in claim 10, wherein the oxidation step is carried out at a temperature of 200 to 600° C.

12. The production process for producing the oxygen reduction catalyst as claimed in claim 10, wherein the oxidation step is carried out over a period of 10 minutes to 24 hours.

13. The process for producing the oxygen reduction catalyst as claimed in claim 10, wherein the oxygen gas concentration in the oxidizing gas is 1 to 100% by volume.

14. The process for producing the oxygen reduction catalyst as claimed in claim 10, wherein the oxidation step is carried out at a temperature of 400° C. in an air atmosphere.

15. The oxygen reduction catalyst as claimed in claim 1, wherein the carbon structure comprises crystalline carbon and amorphous carbon.

* * * * *